United States Patent
Guay

[11] Patent Number: 5,253,673
[45] Date of Patent: Oct. 19, 1993

[54] DISTRIBUTION VALVED MANIFOLD SYSTEM

[76] Inventor: Roger Guay, 2389 Juliette, Rockland, Ontario, Canada, K4K 1L7

[21] Appl. No.: 931,396

[22] Filed: Aug. 18, 1992

[51] Int. Cl.$^5$ .............................................. F16K 15/14
[52] U.S. Cl. ................................... 137/512.4; 137/859
[58] Field of Search ...................... 137/506, 512.4, 859

[56] References Cited

U.S. PATENT DOCUMENTS

| | | | |
|---|---|---|---|
| 2,410,132 | 10/1946 | Smisko | 137/859 X |
| 2,630,874 | 3/1953 | Langdon | 137/512.4 X |
| 2,718,897 | 9/1955 | Andrews | 137/512.4 X |
| 3,087,681 | 4/1963 | Riester | 137/859 |
| 3,642,026 | 2/1972 | Sielaff | 137/859 |

FOREIGN PATENT DOCUMENTS 966255 10/1950 France .............................. 137/859

*Primary Examiner*—Robert G. Nilson
*Attorney, Agent, or Firm*—Robert A. Wilkes

[57] ABSTRACT

A fluid distribution manifold comprises a housing having a port plate having fluid inlet and outlet openings extending therethrough, valve means disposed in the housing for movement between a closed position whereat the valve means engages one side of the port plate and sealingly closes each of the openings and an open position displaced from the port plate whereat the valve means opens the openings and permits fluid communication therebetween, and means for urging the movable valve means towards the closed position.

1 Claim, 1 Drawing Sheet

DISTRIBUTION VALVED MANIFOLD SYSTEM

The present invention relates to a manifold systems for distributing fluids including gases, liquids and flowable solids.

BACKGROUND OF THE INVENTION

Fluid distribution manifold system incorporating one or more check valves between a fluid inlet and a plurality of fluid outlets are known in the art. Thus, when a fluid under pressure is applied to the inlet, fluid will flow under uniform pressure to all components connected to the outlets. When the pressure at the inlet is released, it is sometimes possible that some fluid will leak from a non-restricted or partially obstructed outlet. As is well known, check valves are formed with one inlet for receiving fluid, one outlet for delivering fluid and a movable valve member disposed in a passage connecting the inlet and outlet. The valve member is arranged to permit fluid flow in one direction only. Conventional distribution systems, each outlet must be fitted with a check valve to permit to permit fluid flow from the inlet(s) to the outlets. Should an outlet not be fitted with a check valve, all of the fluid in the system will ultimately escape. Accordingly, there is a need for a fluid distribution manifold system which overcomes this problem.

SUMMARY OF THE INVENTION

The present invention provides a fluid distribution manifold which comprises a housing having a port plate having fluid inlet and outlet openings extending therethrough, valve means disposed in the housing for movement between a closed position whereat the valve means engages one side of the port plate and sealingly closes each of the openings and an open position displaced from the port plate whereat the valve means opens the openings and permits fluid communication therebetween, and means for urging the movable valve means towards the closed position.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
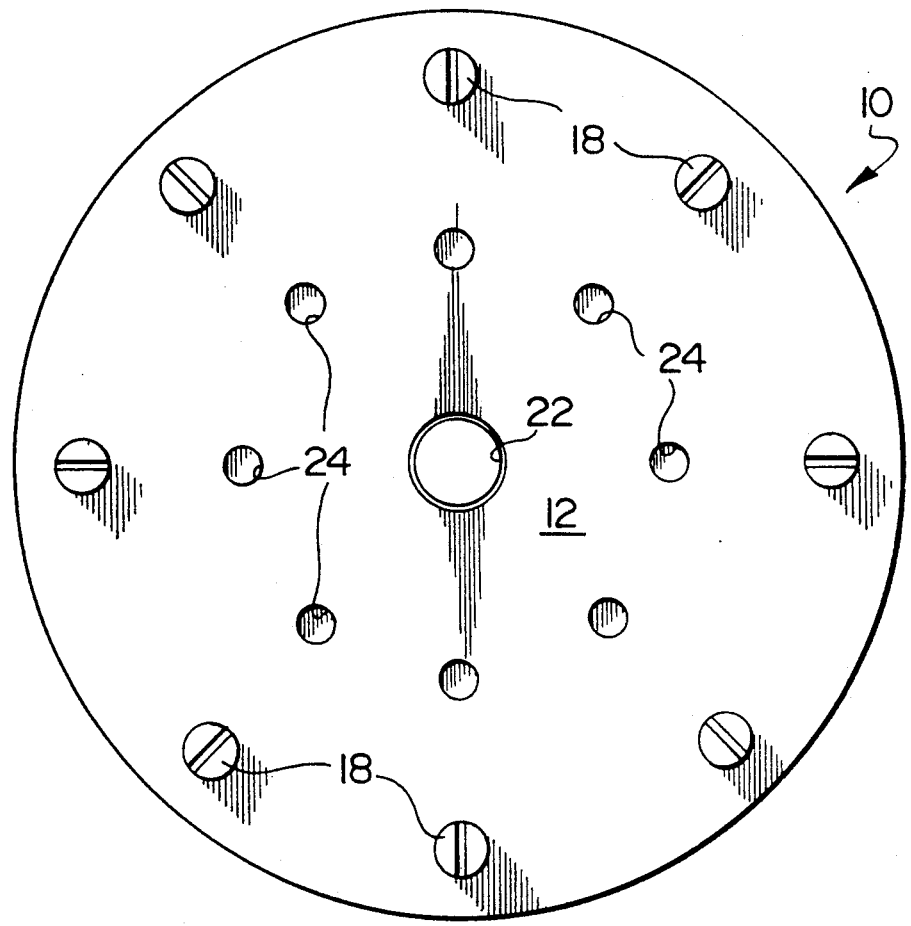
FIG. 1 is a top plan view of the distribution manifold system according to a preferred embodiment of the present invention.

The drawings illustrate a preferred embodiment of the fluid distribution manifold 10 of the present invention. The manifold includes a top port plate 12 and a bottom end plate 14 which are spaced apart by a cylindrical tubular housing 16. The three components are separably secured together by suitable fasteners, such as the bolts and nuts 18 and 20 shown in the drawings.

The port plate is formed with an axial fluid inlet 22 and a plurality of equally angularly spaced fluid outlet openings 24. The fluid inlet is adapted to be connected to a suitable source of pressurized fluid in any manner. It is to be understood that more than one inlet opening may be provided if desired. The fluid outlets are similarly adapted to be connected to components requiring pressurised fluid.

Figure 2:
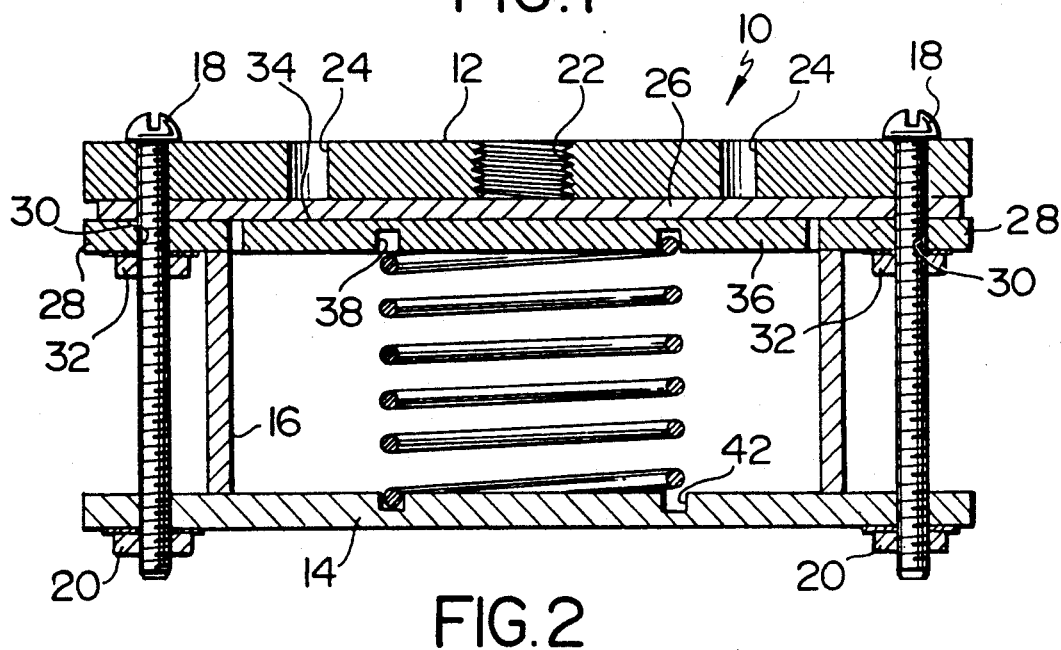
FIG. 2 is a cross-sectional view of the distribution manifold system of FIG. 1.

A flexible gasket or diaphragm 26 engages the underside of the top plate. The perimeter of the diaphragm is secured to the top plate by a rigid ring 28. Ring 28 is formed with a plurality of holes 30 for receiving bolts 18. Nuts 32, threadedly engaged with the bolts, abut the underside of the ring to hold the ring in position. The upper surface 34 of a circular backing plate 36 engages the underside of the diaphragm. The underside of the backing plate is formed with a concentric circular groove 38 to receive the one end of a helical compression spring 40 while the upper surface of end plate 14 is formed with a similar concentric circular groove 42 to receive the lower end of the spring. The spring serves to urge the diaphragm into engagement with the underside to the port plate, as shown in FIG. 2, thereby preventing communication between the inlet and outlet openings. It will be understood that this function can be achieved in other ways such as, for example, a sealed air chamber (not shown) or a liquid chamber having a displaceable chamber (not shown).

The distribution manifold operates as follows. In the absence of a minimum or threshold fluid pressure at the inlet, which is determined by the force applied by the spring, the spring forces the diaphragm into engagement with the underside of the port plate, thereby sealing the inlet and outlet openings and preventing fluid flow therebetween. When the fluid pressure at the inlet exceeds the threshold pressure, the diaphragm is displaced downwardly toward the end plate which unseats the inlet and outlet openings and forms a chamber between the port plate and the upper surface of the diaphragm. This chamber allows fluid to flow from the inlet opening to each of the outlet openings which in turn supply pressured fluid to the components connected to the outlet openings. When the pressure is released, the spring urges the diaphragm back into engagement with the port plate which, once again, seals the inlet and outlet openings.

I claim:

1. A fluid distribution manifold, comprising:

a housing having a circular port plate having a central fluid inlet opening extending axially therethrough, a plurality of equally, angularly spaced fluid outlet openings extending longitudinally through said port plate, a circular end plate axially spaced from said port plate and a cylindrical, tubular side wall extending between and secured to said port plate and said end plate;

a diaphragm disposed in and peripherally sealingly secured to said housing for movement between a closed position whereat said diaphragm engages one side of said port plate and sealingly closes each said openings and an open position displaced from said port plate whereat said diaphragm opens said openings and forms a fluid chamber which permits fluid communication openings;

a rigid ring for securing the periphery of said diaphragm to the underside of said port plate;

a rigid backing plate disposed in said housing for engagement with a side of said diaphragm remote from said port plate; and a helical compression spring disposed between said backing plate and said end plate for urging said diaphragm towards said closed position.

* * * * *